Figures 1, 7:
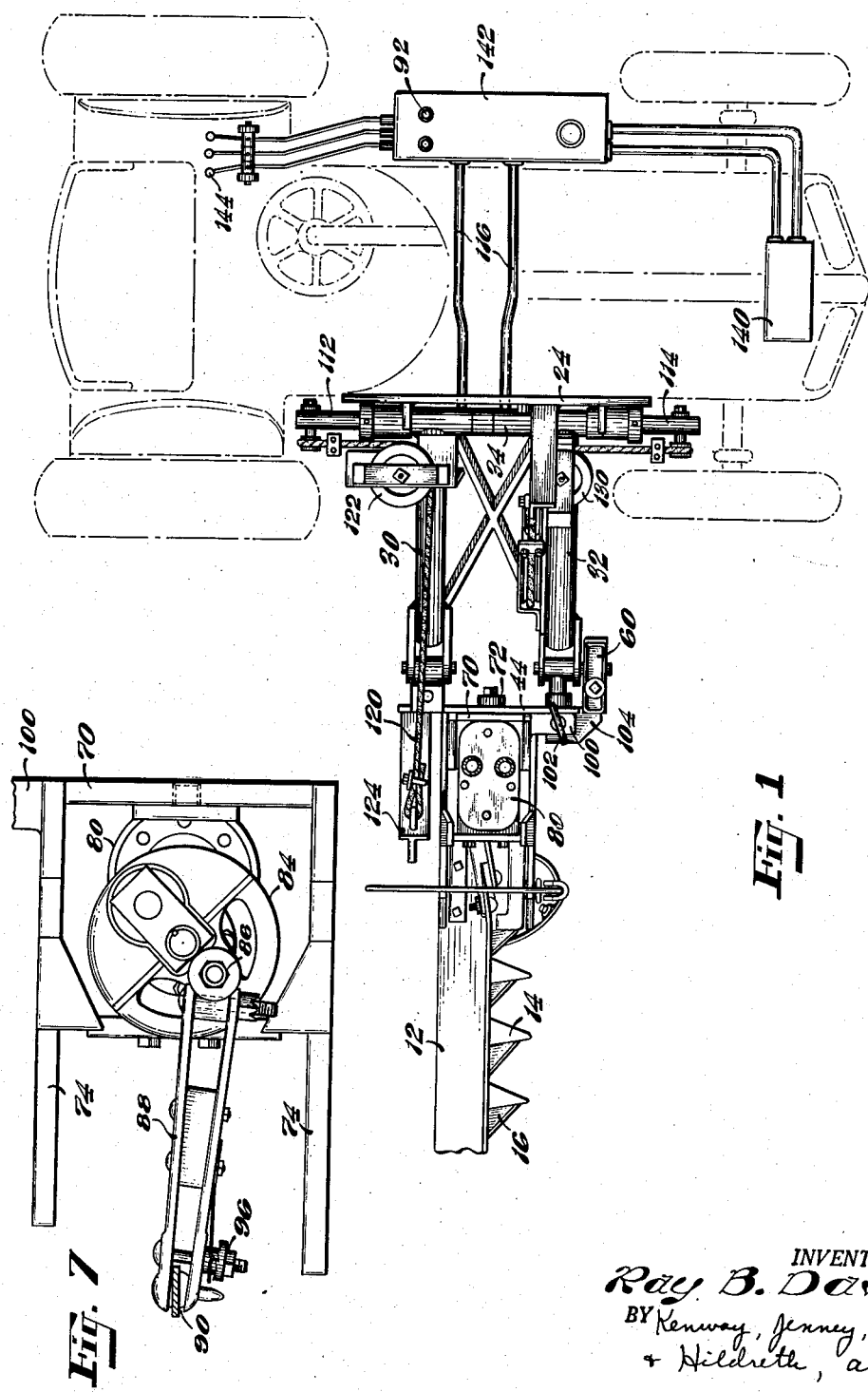

Dec. 22, 1953    R. B. DAVIS    2,663,133
MOWER ATTACHMENT FOR TRACTORS
Filed March 12, 1949    4 Sheets-Sheet 1

INVENTOR.
Ray B. Davis
BY Kenway, Jenney, Witter
& Hildreth, attys.

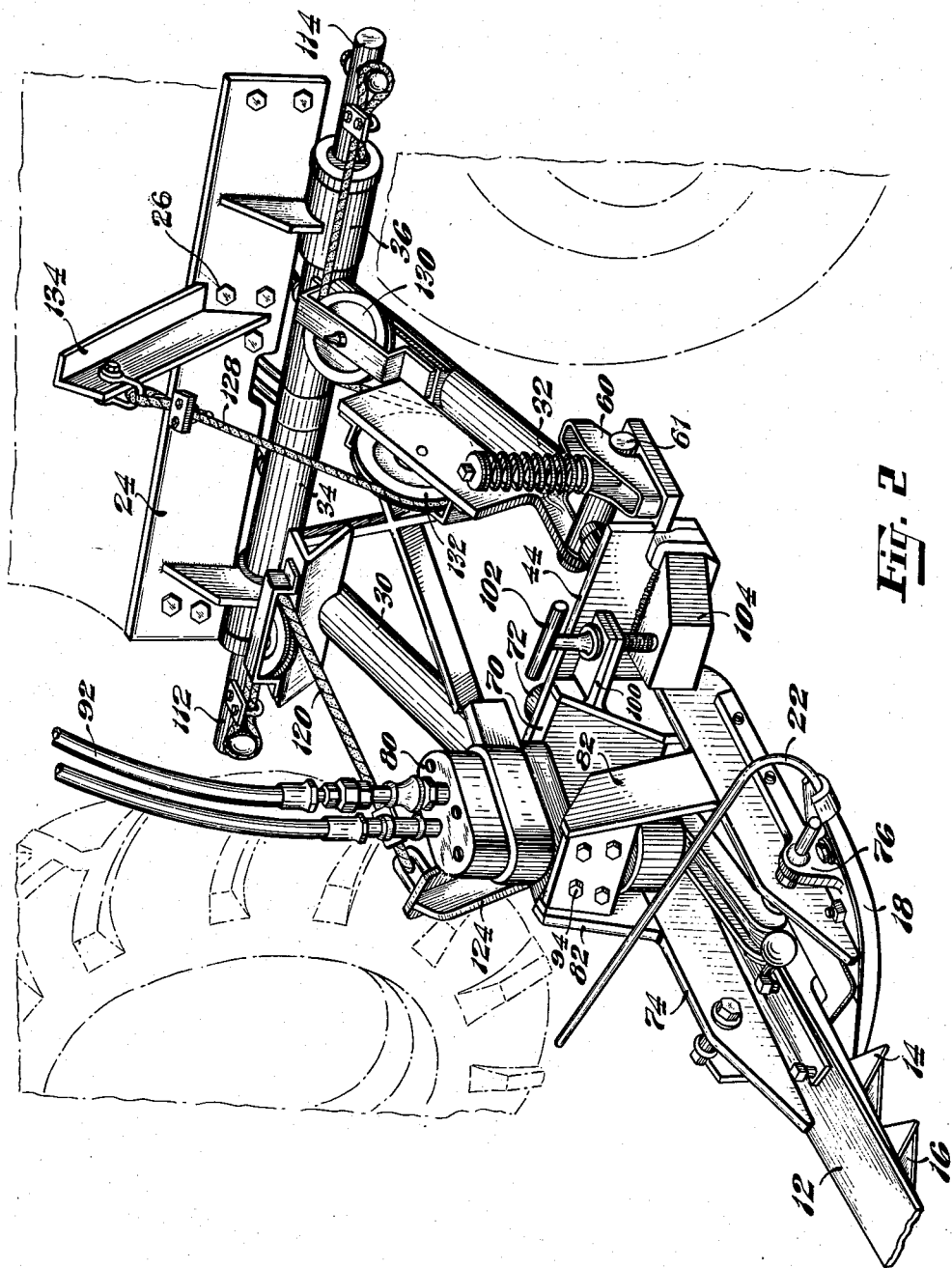

Dec. 22, 1953    R. B. DAVIS    2,663,133
MOWER ATTACHMENT FOR TRACTORS
Filed March 12, 1949    4 Sheets-Sheet 3

INVENTOR.
Ray B. Davis
BY Kenway, Jenney, Witter
& Hildreth, attys

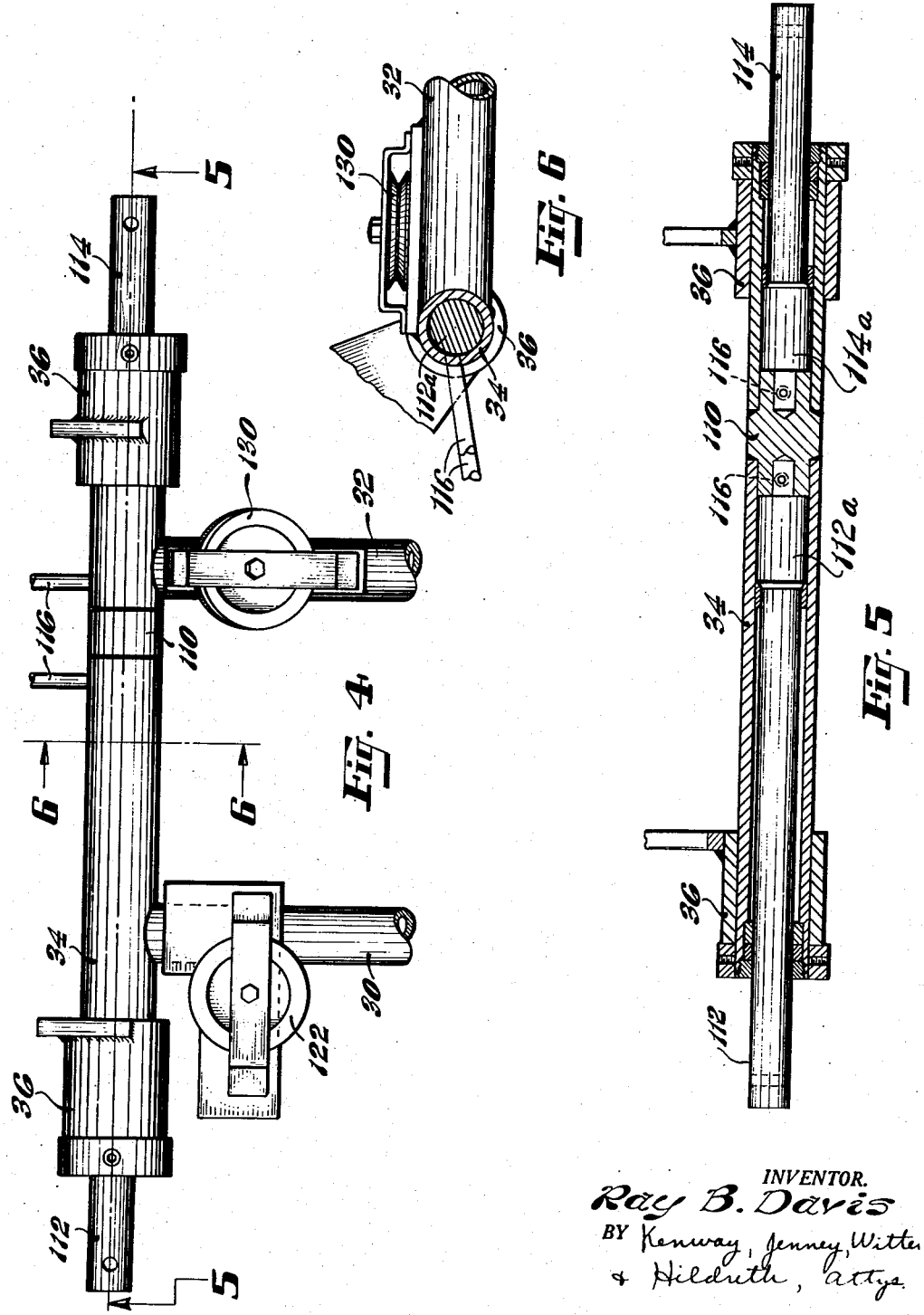

Patented Dec. 22, 1953

2,663,133

UNITED STATES PATENT OFFICE 2,663,133

MOWER ATTACHMENT FOR TRACTORS

Ray B. Davis, Newton Center, Mass., assignor to H. F. Davis Tractor Company, Boston, Mass., a corporation of Massachusetts Application March 12, 1949, Serial No. 81,141

3 Claims. (Cl. 56—25)

The present invention relates to power mowing apparatus, and more particularly to mowing mechanism adapted to be mounted on and operated in conjunction with a tractor or similar self-powered vehicle.

Numerous attempts have been made to provide a mower attachment for tractors, wherein the conventional reciprocating cutter-bar type of mowing mechanism may be mounted for operation laterally of the tractor, with some form of power drive for actuating the bar either directly or indirectly from the tractor engine. These prior devices have likewise included various forms of bar-positioning mechanism. In general, however, the devices heretofore existing have proved cumbersome and unsatisfactory, so that the full possibilities of a tractor-mounted mower have by no means been realized.

One of the uses for which a tractor-mounted mower is especially adapted is in trimming along the sides of highways. In order that this work may be carried out as rapidly as possible, with speeds appreciably greater than heretofore usual for mowing, it is necessary that the position of the cutter bar be readily adjustable over a wide range, to suit the terrain. Not only must the bar be bodily adjustable heightwise, but its angle to the horizontal must be varied over a range in excess of ninety degrees, without interrupting the reciprocation of the cutter, and these adjustments must be carried out with rapid and precise control. A further requirement is that suitable release means be provided which will permit the bar to "break" or swing back in the event an obstruction is encountered and thereby prevent damage to the equipment, yet the release arrangement must be such as to enable the bar quickly to be restored to normal operative position.

With these requirements in view, an object of the invention is to provide novel and improved mower mechanism for tractors and similar vehicles, wherein the mower may readily be mounted on the vehicle with provision for effective actuation from the vehicle power plant, and with means for readily adjusting the position of the mower during tractor advance.

More specifically, it is an object of the invention to provide an improved construction and arrangement of mower mounting and positioning means, wherein fluid-power means for positioning the mower are combined with the mounting means in a novel and effective manner.

In accordance with these and other objects, one of the several features of the invention involves the provision of a tractor-mounted mowing attachment wherein the reciprocation of the knife and the control of cutter bar angle and height are effected by fluid power means, with cutter bar positioning freely and precisely controllable at all times by the operator without interrupting the reciprocation of the knife.

Another feature of the invention concerns the provision of a power-mower attachment having cutter bar positioning means whereby the height of the cutter bar and its angular relation to the horizontal may be independently adjusted over wide ranges by fluid power means directly associated with and carried by the mower unit. More specifically, the fluid power mechanism is associated with and forms a part of the pivotal mounting of the mower assembly, so as to provide an exceedingly compact and effective arrangement.

Figure 3:
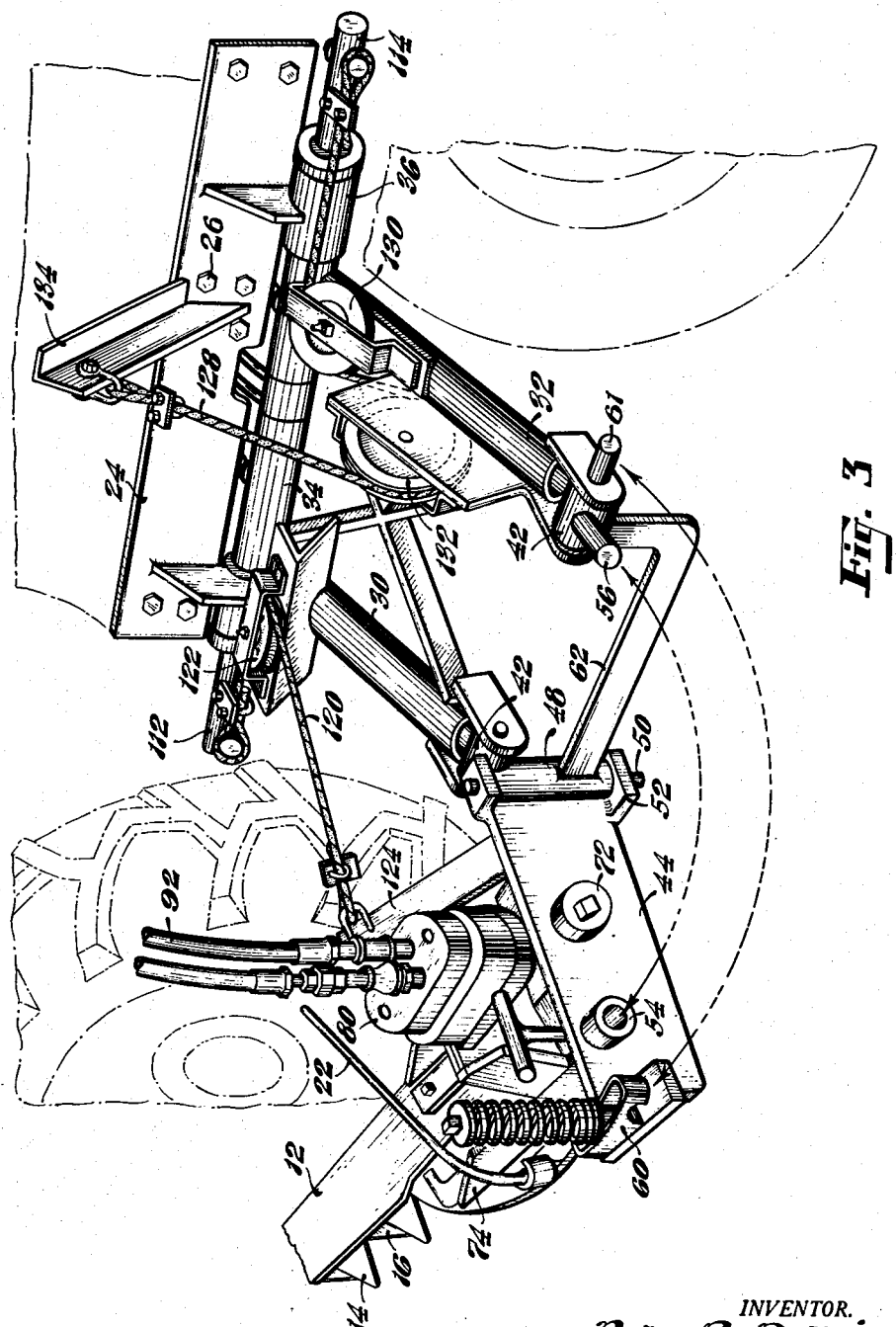

The several features of the invention will be apparent from the following description, taken in conjunction with the accompanying drawings showing a preferred embodiment of the invention. In these drawings, Fig. 1 is a plain view of the mowing attachment shown mounted on a tractor of typical outline, a portion of the mower cutter bar being broken away to permit the mounting and actuating mechanism to be shown on an adequate scale; Fig. 2 is an enlarged oblique view of the mower mounting and actuating mechanism, looking from the left front side of the tractor; Fig. 3 is a view taken similarly to Fig. 2 but showing the cutter bar swung back to illustrate the manner in which the bar assembly "breaks" when an obstruction is encountered; Fig. 4 is an enlarged plan detail of the combined hydraulic lift and trunnion assembly; Fig. 5 is a sectional view of the coaxial hydraulic lift mechanism shown in Fig. 4; Fig. 6 is a detail view partly in section taken on the line 6—6 of Fig. 4; and Fig. 7 is an enlarged bottom view showing the driving connection from the fluid powered driving motion to the reciprocating knife of the cutter bar.

Referring to Figs. 1, 2 and 3, the mowing attachment is shown as mounted on the side of a tractor of typical design. The mechanism is carried on the right hand side intermediate the front and rear wheels, and is adapted to extend laterally as is customary with devices of this type.

The cutter bar 12 of the mower is of conventional construction, employing cooperating sickle bars, the upper bar or knife 14 being reciprocated relative to the stationary lower bar 16. Since the cutter bar is of conventional construction, only the inner end of the bar is illustrated. The bar is provided at its inner or heel end with the usual curved shoe 18 and grass rod 22 and the outer end of the bar may be similarly equipped in accordance with usual practice.

The entire mower assembly with the exception of the hydraulic pump, supply tank and control valves hereinafter described, is carried by a single mounting plate arranged for readily detachable mounting on the tractor frame. This plate, indicated at 24, is adapted to be bolted to the side of the tractor, so that, by removing the bolts 26 and disconnecting the hydraulic supply lines, the entire unit may quickly be removed to leave the tractor free for other uses whenever required.

Intermediate the mounting plate and the cutter bar assembly is a frame having laterally extending members 30 and 32 connected by suitable bracing to form a rigid structure. The members 30 and 32 are mounted at their inner ends on a tubular member 34 journalled in trunnion sleeves 36 attached to the mounting plate 24. As a consequence of this pivotal mounting of the frame for swinging movement about a fore and aft axis lying close to the tractor frame, a substantial range of heightwise movement of the outer end of the frame is possible without requiring that the frame extend laterally from the tractor an excessive distance. This swinging movement of the frame permits the position of the cutter bar to be varied to control the cutting height, and is an adjustment sometimes referred to as "heel lift."

At the outer end of the frame is mounted the cutter bar mechanism, with provision for pivotal movement about an axis parallel to the frame pivot axis. By this pivotal mounting, the cutter bar may be lifted about an axis adjacent its inner end, to vary the angular relation of the bar to the horizontal. This adjustment, frequently termed "bar lift," in conjunction with the "heel lift" adjustment, permits the bar to be adjusted to mow at various heights and along laterally sloping terrain such as upwardly and downwardly sloping bankings and the like.

The hinge mounting for bar lift adjustment comprises hinge members 42 pivotally mounted at the outer ends of the frame 30—32. The hinge members carry a hinge plate 44 on which the cutter bar assembly is mounted in a manner to be described. Directly associated with this hinge mounting for bar lift is a pivotal connection that permits the cutter bar to swing to the rear in the event an obstruction is encountered during mowing. This swing or "break-away" mounting is best shown in Fig. 3, wherein the rear hinge member carries a normally vertical sleeve 48, through which passes a shaft 50 secured in lugs 52 on the hinge plate 44. Detachable connection between the plate and the forward hinge member is provided by a socket 54 which fits over a stub 56 on the forward hinge when the plate is in normal operative position. A spring-pressed jaw 60 mounted at the forward-end of the plate 44 provides a releasable connection with the projecting end of the forward hinge pin 61, so as to lock the plate in the position shown in Fig. 2 during normal mowing, but the jaw 60 permits the cutter bar to swing or break away to the rear whenever an obstruction is encountered. After such an occurrence, the apparatus is quickly restored to operation by reversing the tractor, so as to swing the cutter bar forwardly until the jaw 60 reengages the hinge pin 61. A strap 62 connects the hinge members 42 to maintain the front member in proper alignment to receive socket 54.

The cutter bar assembly is mounted on the hinge plate 44 with provision for tilting adjustment about an axis transverse to the direction of tractor advance. This cutter bar assembly includes the driving means for the cutter knife, so that no change occurs in the relationship of the knife and its driving means when any of the adjustments are made in the position of the cutter bar. The cutter bar assembly is carried by a block 70 having a pivotal connection 72 to the hinge plate 44. The block 70 forms one end of a sub-frame composed of side members 74 to which are bolted the upstanding lugs 76 with which standard cutter bar mechanism is customarily provided.

The knife of the cutter bar is arranged to be reciprocated, as has already been indicated, by means directly associated with the cutter bar. Such means is preferably, although not necessarily, of the fluid powered type, and may have either a rotary or a reciprocating output. In the illustrative embodiment is shown a form of drive that has proved particularly satisfactory in operation, comprising a hydraulic motor 80 of the gear type. This motor is carried by arms 82 secured to the side members 74 of the cutter bar frame. The driving shaft of the motor is provided with a flywheel 84 having a crank pin 86 connected by a link 88 and ball and socket joint 90 to the knife of the cutter bar. Fig. 7 is a bottom view of this driving connection, taken intermediate the cutter bar and the drive motor to enable the parts to be seen. By mounting the drive motor above the cutter bar adjacent the inner end of the bar, with the drive end of the motor close to the top of the reciprocating knife, a substantially straight line drive may be provided so as to reciprocate the knife freely without binding, and equally well in all positions in which the cutter bar may be required to operate. Flexible hose lines 92 connect the driving motor to the source of hydraulic fluid under pressure, as hereinafter described. It will be apparent that the simplicity of the motor mounting, wherein bolts 94 serve to secure the motor to the subframe, that the hydraulic power drive may readily be detached from the cutter bar (the connecting rod or link 88 being released by loosening ratchet clamp nut 96 at the ball end) to permit use of the motor on other equipment which the tractor may carry or which may be attached to the tractor, and requiring a power drive adjacent the operating point.

To provide positive adjustment of the cutter bar tilt about the pivot 72, the cutter bar subframe is provided with a projecting arm 100 through which passes a hand screw 102, the threaded end of which is received in a block 104 secured to the plate 44. Thus, by rotating the hand screw the entire sub-frame, with cutter bar and drive motor, may be tilted in a fore and aft direction to the desired mowing angle of attack.

To provide effective and precise control of cutter bar position during mowing, means are provided by which the operator may by easily actuated controls cause the bar to be raised or lowered to the desired height and the proper angular relation to the ground obtained. The mechanism by which these adjustments are obtained is, as has already been indicated, a particular feature of the invention, and embodies fluid-powered devices in a novel and compact arrangement. Specifically, separate fluid-powered units are combined with the pivotal mounting of the lift frame in such a way as to occupy a minimum of space, while providing powerful and substantially direct actuation of bar lift and heel lift adjustment.

These fluid-powered units, preferably hydraulically actuated from the same source of fluid pressure as the cutter bar driving motor, are mounted within and formed in part by the tubular member 34 which provides the pivotal or trunnion mounting for the entire mower attachment. To this end, the tubular trunnion member is divided into two sections by means of a center plug 110, forming a closure so as to provide separate chambers on either side of the plug. These chambers constitute hydraulic cylinders, within which are pistons 112a and 114a having piston rods 112 and 114 axially movable. Conventional sealing rings are provided at the inner ends of the rods and the outer ends of the cylinders. As already indicated, the tubular member is journalled in sleeves 36 on the mounting plate and forms the inner member or base of the mower lift frame. Communication between the cylinders and the hydraulic supply to be described is by hose lines 116 through ports in the cylinders adjacent the closed ends.

To effect the bar lift and heel lift adjustments, the outer ends of the piston rods are connected by flexible cables and appropriate sheaves to anchor points on the hinge plate 44 and on the mower mounting plate 24, respectively. Thus, the bar lift unit 112 is connected, by cable 120 passing over sheave 122 on the frame member 30, to upstanding arm 124 on the hinge plate 44. When the piston rod 112 is extended, through the admission of fluid to the bar lift cylinder, the arm 124 is drawn toward the tractor to lift the cutter bar mechanism about the outer hinge axis.

The heel lift connection is provided by cable 128 from the end of the unit 114, around sheaves 130 and 132 on the forward frame member 32 and thence to an anchor on arm 134 secured to and projecting outwardly and upwardly from the main mounting plate 24. Upon outward movement of piston rod 114, from its cylinder, with consequent cable take-up, the sheave 132 is drawn toward the arm 134, thereby raising the heel lift frame about the trunnion axis of member 34.

The supply of hydraulic fluid for the operation of the mower motor and the actuation of the bar and heel lift units is provided by a suitable hydraulic pump or other means, indicated at 140 and conveniently driven by the tractor engine. A supply tank is shown at 142, with which are associated suitable control valves of conventional design for controlling the supply of fluid to the knife driving motor, and for admitting or releasing fluid from the lift cylinders. Hand levers 144 permit convenient actuation of the respective control valves by the tractor operator.

There has thus been described a power mower attachment for tractors, characterized by compactness and simplicity of arrangement and construction, wherein the drive for the knife is directly associated with the knife at all times and in fixed relation to the cutter bar whatever the angle or position of the cutter bar. In addition, novel and effective means have been provided for accomplishing cutter bar adjustment under the ready control of the operator, so that the operator may with a minimum of effort adjust the cutter bar position to the proper height and angle for varying terrain, while mowing at relatively high speed.

I claim as my invention:

1. A power mowing attachment for a tractor, comprising a mounting plate member for attachment to a tractor, a laterally extending member having a free outer end and an inner end pivotally connected to said mounting plate member for pivotal movement about a substantially horizontal axis, said pivotal connection between said mounting plate member and said laterally extending member comprising horizontally spaced trunnion sleeves on one of said members and a substantially horizontally disposed tube on the other of said members and journaled in said trunnion sleeves, a pair of pistons reciprocable in said tube, a closure plug in said tube between said pistons and cooperating therewith to define a pair of fluid receiving chambers within said tube, means connecting one of said pistons to said laterally extending member and to said mounting plate member to pivot said laterally extending member about said pivotal connection upon reciprocation of said one piston in said tube, a cutter bar mechanism hingedly connected to the free outer end of said laterally extending member, and means connecting the other of said pistons to said cutter bar mechanism to move said cutter bar mechanism about said hinged connection upon reciprocation of said other piston in said tube.

2. A power mowing attachment for a tractor, comprising a mounting plate member for attachment to a tractor, a laterally extending member having a free outer end and an inner end pivotally connected to said mounting plate member for pivotal movement about a substantially horizontal axis, said pivotal connection between said mounting plate member and said laterally extending member comprising horizontally spaced trunnion sleeves on one of said members and a substantially horizontally disposed tube on the other of said members and journaled in said trunnion sleeves, a piston reciprocable in said tube, a closure for said tube cooperating with said piston to define a fluid receiving chamber within said tube, means connecting said piston to said laterally extending member and to said mounting plate member to pivot said laterally extending member about said pivotal connection upon reciprocation of said piston in said tube, and a cutter bar mechanism hingedly connected to the free outer end of said laterally extending member.

3. A power mowing attachment for a tractor, comprising a mounting plate member for attachment to a tractor, a laterally extending member having a free outer end and an inner end pivotally connected to said mounting plate member for pivotal movement about a substantially horizontal axis, said pivotal connection between said mounting plate member and said laterally extending member comprising horizontally spaced trunnion sleeves on one of said members and a substantially horizontally disposed tube on the other of said members and journaled in said trunnion sleeves, a piston reciprocable in said tube, a closure for said tube cooperating with said piston to define a fluid receiving chamber within said tube, a cutter bar mechanism hingedly connected to the free outer end of said laterally extending member, and means connecting said piston to said cutter bar mechanism to pivot said cutter bar mechanism about said hinged connection upon reciprocation of said piston in said tube.

RAY B. DAVIS.

References Cited in the file of this patent

UNITED STATES PATENTS

| Number | Name | Date |
|---|---|---|
| 1,728,150 | Christianson | Sept. 10, 1929 |
| 1,956,007 | Davin et al. | Apr. 24, 1934 |
| 1,958,405 | Anthony et al. | May 15, 1934 |
| 2,170,573 | Pierson | Aug. 22, 1939 |
| 2,171,761 | Paradise et al. | Sept. 5, 1939 |
| 2,291,987 | Rogers | Aug. 4, 1942 |
| 2,311,117 | MacDonald et al. | Feb. 16, 1943 |
| 2,324,563 | Custenborder | July 20, 1943 |
| 2,328,838 | Oberlink | Sept. 7, 1943 |
| 2,457,693 | Leicy | Dec. 28, 1948 |